(12) United States Patent
Gibson et al.

(10) Patent No.: US 10,133,039 B2
(45) Date of Patent: Nov. 20, 2018

(54) GRADIENT INDEX INFRARED TRANSMITTING OPTICS AND METHOD FOR MAKING SAME

(71) Applicants: Daniel J. Gibson, Cheverly, MD (US); Mikhail Kotov, Silver Spring, MD (US); Geoff Chin, Arlington, VA (US); Shyam S. Bayya, Ashburn, VA (US); Jasbinder S. Sanghera, Ashburn, VA (US); Vinh Q. Nguyen, Fairfax, VA (US)

(72) Inventors: Daniel J. Gibson, Cheverly, MD (US); Mikhail Kotov, Silver Spring, MD (US); Geoff Chin, Arlington, VA (US); Shyam S. Bayya, Ashburn, VA (US); Jasbinder S. Sanghera, Ashburn, VA (US); Vinh Q. Nguyen, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1013 days.

(21) Appl. No.: 14/210,868

(22) Filed: Mar. 14, 2014

(65) Prior Publication Data

US 2016/0377845 A1    Dec. 29, 2016

Related U.S. Application Data

(60) Provisional application No. 61/787,473, filed on Mar. 15, 2013.

(51) Int. Cl.
*G02B 3/00* (2006.01)
*C03C 3/32* (2006.01)
(Continued)

(52) U.S. Cl.
CPC ............ *G02B 13/146* (2013.01); *C03C 3/321* (2013.01); *C03C 3/323* (2013.01); *C03C 4/10* (2013.01);
(Continued)

(58) Field of Classification Search
None
See application file for complete search history.

(56) References Cited

U.S. PATENT DOCUMENTS 3,853,568 A * 12/1974 Chvatal ............... C03C 3/12
252/625
4,929,065 A * 5/1990 Hagerty ............... G02B 3/0087
359/653
(Continued)

OTHER PUBLICATIONS

Moore, "Gradient-index optics: a review," Appl. Opt., vol. 19, No. 7, pp. 1035-1038 (1980).
(Continued)

*Primary Examiner* — Derek S Chapel
(74) *Attorney, Agent, or Firm* — US Naval Research Laboratory; Rebecca L. Forman

(57) ABSTRACT

A method for making a gradient index infrared transmitting optic by thermally treating a preform, where the preform comprises two or more infrared transmitting glasses having different compositions and optical properties, where there is an interface between adjacent glasses, where during the thermal treatment one or more chemical elements from the glasses diffuses through one or more interface resulting in a diffused gradient index optical element comprising a gradient in the chemical element concentration, and where the optical element has a gradient in refractive index and dispersion. Also disclosed is the related infrared transmitting optical element made by this method.

12 Claims, 5 Drawing Sheets

(51) Int. Cl.
  *C03C 23/00* (2006.01)
  *G02B 13/14* (2006.01)
  *C03C 4/10* (2006.01)
(52) U.S. Cl.
  CPC .......... *C03C 23/007* (2013.01); *G02B 3/0087* (2013.01)

(56) References Cited

U.S. PATENT DOCUMENTS

| | | |
|---|---|---|
| 5,044,737 A | 9/1991 | Blankenbecler |
| 5,171,344 A | 12/1992 | Noda |
| 5,262,896 A | 11/1993 | Blankenbecler |
| 5,630,857 A | 5/1997 | Xu et al. |
| 5,917,105 A | 6/1999 | Xu et al. |
| 7,002,754 B2 | 2/2006 | Baer et al. |
| 2006/0233512 A1* | 10/2006 | Aitken ................... C03C 3/321 385/147 |
| 2010/0064731 A1* | 3/2010 | Nguyen ............ C03B 37/01265 65/434 |
| 2010/0126219 A1* | 5/2010 | Bayya ..................... C03C 3/253 65/32.1 |
| 2012/0206796 A1* | 8/2012 | Gibson ............... C03B 23/0006 359/356 |
| 2016/0375669 A1* | 12/2016 | Gibson ............... B32B 37/1009 156/105 |

OTHER PUBLICATIONS

Ji et al., "A bio-inspired polymeric gradient refractive index (GRIN) human eye lens," Optics Express, vol. 20, No. 24, pp. 26746-26754 (2012).

* cited by examiner (a)     (b)

(a)     (b)

GRADIENT INDEX INFRARED TRANSMITTING OPTICS AND METHOD FOR MAKING SAME

PRIORITY CLAIM

The present application is a non-provisional application claiming the benefit of U.S. Provisional Application No. 61/787,473, filed on Mar. 15, 2013 by Dan J. Gibson et al., entitled "Gradient Index Infrared Transmitting Optics and Method for Making Same," the entire contents of which is incorporated herein by reference.

BACKGROUND OF THE INVENTION

Field of the Invention

The present invention relates generally to infrared optics and, more specifically, to infrared lens elements with gradient optical properties and multi-element infrared imaging lens systems with gradient index optical elements.

Description of the Prior Art

It is common to refer to an optical glass as having a refractive index at a certain wavelength and to describe the shape of the dispersion function using the Abbe number, V (or v)=$(n_d-1)/(n_F-n_C)$, and various partial dispersion values, $P_{x,y}=(n_x-n_y)/(n_F-n_C)$, as dictated by the precision of the optical design. Since infrared transmitting glasses often have poor transmission for visible wavelengths, a 'modified' Abbe number is used where the visible wavelengths, $\lambda_F$, $\lambda_d$, and $\lambda_C$, are replaced with more suitable infrared wavelengths. Two common examples are the mid-wave infrared (MWIR), where the wavelengths 3, 4 and 5 µm are used and the long-wave infrared (LWIR) where the wavelengths 8, 10 and 12 µm are used to define the MWIR dispersion, $V_{(3-5)}$ (or $V_{MWIR}$)=$(n_4-1)/(n_3-n_5)$ and LWIR dispersion, $V_{(8-12)}$ or ($V_{LWIR}$)=$(n_{10}-1)/(n_8-n_{12})$ respectively. While these dispersion parameters describe the wavelength dependent refractive index of IR-transmitting materials sufficiently to aid the selection of materials for a lens design, they lack the precision required for modern high performance optical design software. As a result, the refractive index is also represented in either tabular form (a list of indices at specific wavelengths) or more precisely by Sellmeier coefficients that permit interpolation and extrapolation of refractive index values.

Refractive optical imaging systems typically utilize multiple refractive optical elements to manipulate light and create an image. Commonly, these individual homogeneous optical elements are comprised of different optical materials with different optical properties, including refractive indices, dispersions, or thermo-optic coefficients, in such combinations that attempt to reduce or eliminate problems associated with using a single material, including for example chromatic dispersion, spherical aberration, coma, astigmatism, and thermal drift. For various reasons, including reducing system size, weight and complexity or improving performance and reliability, optical designers may opt to use specialized optical elements, such as gradient index (GRIN) optics. A GRIN optic is a single optical element wherein the optical properties vary in a controlled way within the bulk of the optical element. GRIN optics are limited to primarily visible wavelengths as the methods used in their fabrication are not well-suited to IR transparent materials.

Gradient index (GRIN) optics with radial gradients are typically fabricated using ion exchange and diffusion of ions in a porous body. Go!Foton's SELFOC® product is a commercial example of radial GRIN lens. In the ion-exchange process, an optical blank comprised of an oxide glass with mobile dopant ions is submerged in a hot salt bath for an extended time such that the dopant ions in the blank diffuse through the blank into the bath and ions from the bath diffuse into the blank. This exchange (for example Ag+ for Li+) imparts a continuously varying compositional gradient within the blank and thereby a gradient in the optical properties of the optical element. This process is typically not possible with IR transparent materials, especially those used beyond a wavelength of about 1.6 µm, as ion exchange has not been successfully demonstrated in such materials. Moreover, infrared transmitting glasses heavily doped with alkali ions (Li+, Na+, K+, etc. and the like) are not chemically durable. Furthermore, the thermodynamics of diffusion limit the size of optical elements fabricated via the method under reasonable times to about 10 mm in diameter, which poses a problem for imaging optics in general and IR imaging systems specifically.

GRIN optics with axial gradients are commercially available for visible light, for example LightPath Technologies' Gradium® lenses, and are fabricated by a diffusion process wherein one stacks a series of plates of glasses and heats the assemblage for a time and temperature to diffuse the constituents from plate to plate resulting in an optic blank with a gradient in composition and refractive index. The resulting blank is subsequently cut and polished into a lens shape resulting in an optical element with curved surfaces and an internal gradient of optical properties continuously varying along the direction of the optical axis. Since the gradient is in the direction of the optical axis, and the diffusion takes place entirely within the optical element, the diffusion distances and times can be shorter than those for radial GRIN optics. Diffused axial GRIN optical elements are therefore not subject to the same diameter limitations as ion-exchanged radial GRIN optical elements. Axial and radial GRIN optical elements have different transfer functions and uses, and the former typically must have one or two curved surfaces while the latter often has flat surfaces. The methods employed by the prior art are not suitable for use with IR transmitting glasses in general and chalcogenide glasses in particular, wherein one or more elemental components may be prone to sublimation or out-gassing from the glass, thereby uncontrollably changing the glass composition and properties and forming bubbles, pores, voids, soot or other regions of devitrification or phase separation, which also has a detrimental effect on refractive index, dispersion and other optical properties.

Polymer GRIN lenses with axial, radial and spherical gradients have recently been demonstrated by layering polymer films with different optical properties into a stack and subsequently molding and/or machining the surfaces of the stack. The polymer GRIN optical elements are comprised of multiple polymer films wherein each film is on the order of 50 µm thick and is comprised of many (>1000) nano-layers (<10 nm thick) of alternating polymer compositions such that each film possesses a unique refractive index. The polymer GRIN optical elements possess discontinuous or stair-step gradients in refractive index as the polymers comprising the nano-layers do not undergo a chemical diffusion process. In order to distinguish this type of profile from those of the continuously varying "diffused" GRIN optical elements, we term these "segmented" GRIN optical elements, wherein the gradient may be characterized by the finite thickness or other dimension of the segments (in this case ~50 µm) and a finite change in refractive index ($\partial n$) or other optical property (in this case $\partial n$=~0.0016).

The prior art provides GRIN optics for visible wavelengths but none address the application to materials capable of operating at infrared wavelengths greater than about 1.6 μm, for example infrared transmitting glasses and specifically chalcogenide glasses. The method of the current invention addresses the shortcomings of the state of the art and enables the fabrication of gradient index optical elements capable of operating over a broad range of infrared wavelengths, from about 800 nm to about 18 μm.

BRIEF SUMMARY OF THE INVENTION

The aforementioned problems are overcome in the present invention which provides a method for making a gradient index infrared transmitting optic by thermally treating a preform, where the preform comprises two or more infrared transmitting glasses having different compositions and optical properties, where there is an interface between adjacent glasses, where during the thermal treatment one or more chemical elements from the glasses diffuses through one or more interface resulting in a diffused gradient index optical element comprising a gradient in the chemical element concentration, and where the optical element has a gradient in refractive index and dispersion. Also disclosed is the related infrared transmitting optical element made by this method.

The invention provides a method for fabricating optical elements with continuously varying or gradient internal optical properties (refractive index, dispersion, thermo-optic coefficient and others). The optical elements of this invention will enable infrared optical system engineers to design and build improved imagers with advantages and features previously only available to designers of visible systems. The elements could be used in broad-band infrared imagers, for example achromatic dual-band IR imaging systems, which will reduce the system size, weight and complexity by reducing the number of separate optical elements in imaging systems. System tolerances and costs can be reduced by eliminating the air space between closely spaced elements in lens systems. System performance can be improved as needed for next generation focal plane arrays.

The glasses described herein can be used to make lenses and optical elements for applications in the SWIR to LWIR regions, represented by 1 to 14 microns wavelength. They can be used for specific wavelength applications such as SWIR (1-2 microns), MWIR (2-5 microns), or LWIR (7-14 microns) or their combinations, and wavelengths in between.

The optical elements of the current invention will replace existing elements in infrared optical system designs with a size, weight, and performance advantage. The alternatives to the current invention are already in use in the form of many-element IR imaging lenses, but they are becoming larger, heavier and more complex as IR imaging sensor arrays become smaller and more sensitive. GRIN optics for infrared use are not currently available.

These and other features and advantages of the invention, as well as the invention itself, will become better understood by reference to the following detailed description, appended claims, and accompanying drawings.

DETAILED DESCRIPTION OF THE INVENTION

The present invention provides optical elements for the transmission and manipulation of infrared light, and more specifically infrared lens elements with a refractive index gradient and multi-element infrared imaging lens systems wherein at least one optical element exhibits a refractive index gradient. The described invention is a class of optical elements having a refractive index profile and a dispersion profile and a method for the fabrication of the elements. Specifically, the optical elements are comprised of a diffuse distribution of non-silica, infrared transmitting specialty glasses with different refractive indices and/or dispersions. The method for making the optical elements uses diffusion of glass components at elevated temperature to provide smooth gradients in index and dispersion. The optical elements enable lenses that function over a broad wavelength range in the infrared, 800 nm—18 μm, or a portion thereof, depending on the glasses used.

Figure 1:
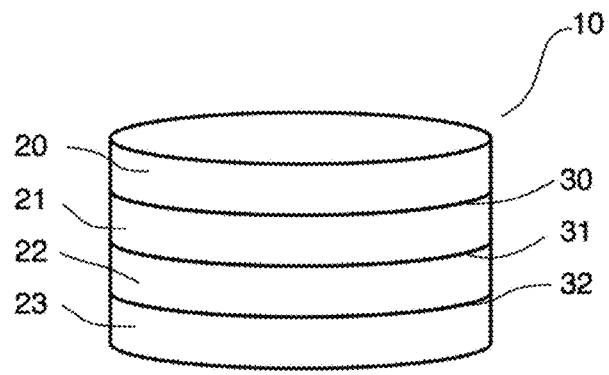
FIG. 1 is a schematic of an IR transmitting segmented axial GRIN preform comprising four IR transmitting glasses with three internal interfaces.
Figure 2:
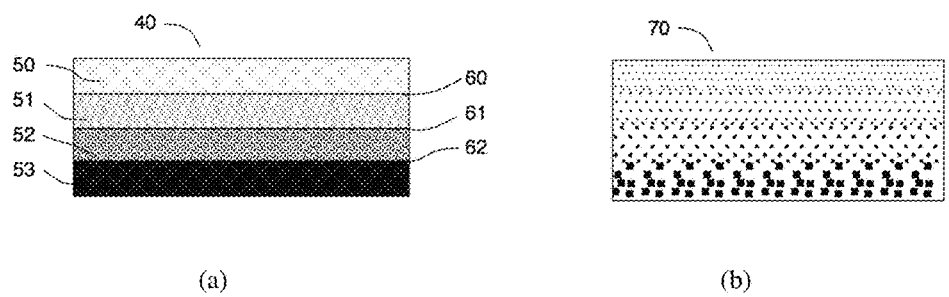
FIG. 2 shows schematics of (a) an IR transmitting segmented axial GRIN preform and (b) a diffused axial GRIN optical element produced from the preform.

The infrared transmitting optical elements of this invention comprise infrared transmitting glass wherein a gradient in glass composition, specifically a gradient in chemical element concentration, exists and imparts a gradient in refractive index and dispersion. The glass is typically, but not exclusively, chosen from a set of chalcogenide glasses that may contain one or more of the following elements: S, Se, Te, Ga, Ge, As, Sn, Sb and Ag. Halides such as F, Cl, Br and I can also be added to the glass compositions to make chalcohalide glasses. As shown in FIG. 1, the optical element is fabricated by thermally treating a preform 10, which comprises 2 or more segments 20, 21, 22, 23 of infrared transmitting glasses with different compositions and optical properties. Each segment is substantially bonded to all other segments adjacent to it without soot, bubbles, voids, pores or foreign matter at the inter-segmental boundaries 30, 31, 32. The preform is thermally treated for a prescribed time and temperature such that 1 or more chemical elements comprising the glasses diffuse through the inter-segment boundaries, resulting in a gradient in elemental concentration, refractive index, and IR Abbe numbers within the body of the optical element. The segments within the preform may have different shapes and dimensions, for example a preform may comprise 4 sheet-like layers, each comprising a different chalcogenide glass as in FIG. 1. The interfaces or boundaries between the preform segments, as well as the outer surfaces, may have positive, negative, infinite or some compound curvature. As shown in FIG. 2, the glasses 50, 51, 52, 53 and their compositions, segment dimensions, and interface profiles 60, 61, 62 of the preform 40 may be chosen or designed such that the resulting refractive index and dispersion gradient of the diffused GRIN optical element 70 produced from said preform may refract light within the optical element as in a gradient index (GRIN) lens, or a dispersion gradient may correct for chromatic aberrations as in an achromatic lens. The glasses and their compositions, segment dimensions and interface profiles of the preform may be chosen or designed such that a gradient in some other optical or physical property of the optical element may be created for another purpose, for example a gradient in thermal expansion and thermooptic coefficient may be designed to create an athermal optical element. Furthermore, the glasses of the preform are chosen or designed such that their viscosities are similar, they have similar glass transition temperatures (Tg) and they have similar or complementary thermal expansion coefficients.

Figure 3:
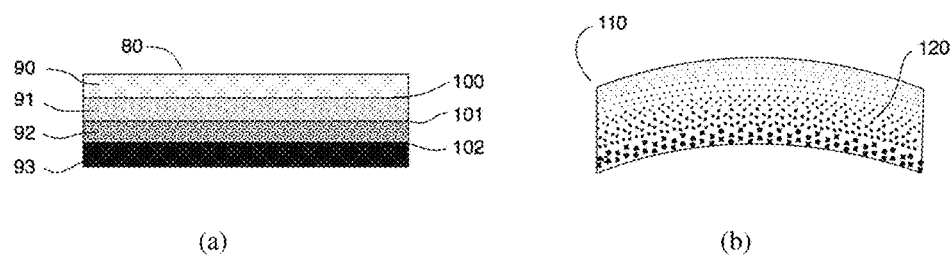
FIG. 3 shows schematics of (a) an IR transmitting segmented axial GRIN preform comprising four IR transmitting glasses with three internal interfaces and (b) a curved diffused axial GRIN optical element with an internal refractive index gradient produced from the preform.

As shown in FIG. 3, the preform 80 (comprising glasses 90, 91, 92, 93 and boundaries 100, 101, 102) may undergo shaping during the method by slumping or molding such that the resultant diffused GRIN optical element 110 possesses an optical property gradient 120 with substantially different spatial orientation from that of the preform. For example a preform resembling a cylinder in shape and comprising two IR transmitting chalcogenide glasses with a flat planar interface between them, may be heated between a pair of approximately spherical mold halves which deform the preform in a controlled way and contain the glass body during the diffusion process.

The GRIN optical elements of the present invention and the method to make them are novel and have unique features. The segments in the preforms comprise infrared transmitting glasses, which may be prone to sublimation, decomposition, devitrification or phase separation and therefore require special handling and processing considerations, atypical of glasses used in optics for visible light including silica, silica-based and oxide glasses. For this reason, the methods of the prior art cannot be applied to fabrication of GRIN optical elements using these materials. The current invention requires a segmented GRIN preform wherein the segments of infrared transmitting glasses are each substantially bonded to all other adjacent segments without soot, bubbles, voids, pores or foreign matter at the inter-segmental boundaries. Unlike in oxide glasses of the prior art, where typically the cation element (Ag, Li, Na, K, etc.) moves during diffusion, in infrared transmitting glasses, the chalcogen element (S, Se, Te) moves during diffusion, creating the desired refractive index gradient profile.

Example 1

Figure 4:
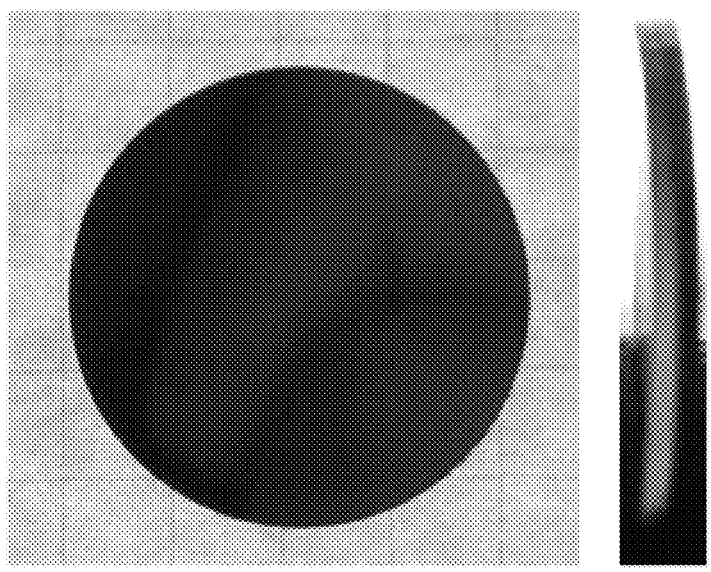
FIG. 4 shows an infrared transmitting As—S—Se based glass diffused GRIN optic with a sulfur concentration gradient from 46% to 61% over 40 μm.
Figure 5:
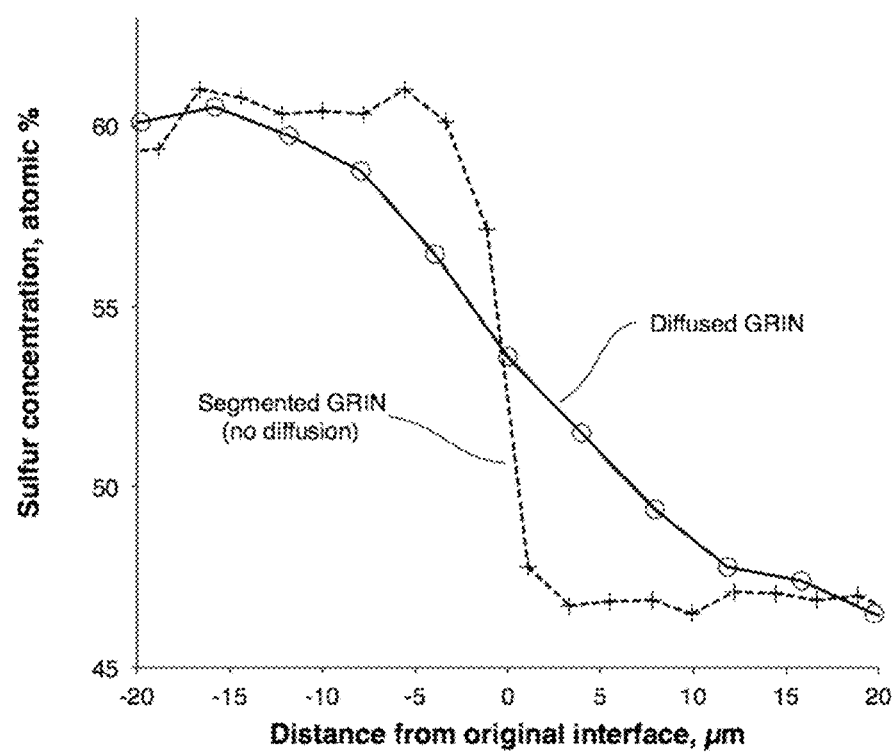
FIG. 5 shows sulfur concentration profiles in As—S—Se segmented GRIN (dashed line) and diffused GRIN (solid line) optical elements.

An IR transmitting diffused axial GRIN optical element comprising infrared transmitting glass comprising As, S and Se was fabricated using the method of the present invention and is shown in FIG. 4. The starting preform was comprised of two glasses: $As_{39}S_{61}$ and $As_{39}S_{46}Se_{15}$ (subscripts denote concentration in atomic percentage) and had a segmented axial GRIN profile. The preform was heated to a temperature of 325° for 3 hours to create a diffused axial GRIN optical element with a diameter of 25 mm and a total thickness of 1.8 mm. Scanning electron microscopy with energy dispersive spectroscopy (SEM/EDS) was used to measure the concentration of sulfur near the interface within the segmented axial GRIN preform and near the center plane of the diffused axial GRIN optical element. In the segmented axial GRIN preform, a sulfur concentration gradient from 61% to 46% was measured over a distance of about 1 μm (shown in FIG. 5), which coincides with the spatial resolution of the measurement technique. In the diffused axial GRIN optical element, a sulfur concentration gradient from 61% to 46% was measured over a distance of about 40 μm (also shown in FIG. 5).

Example 2

Figure 6:
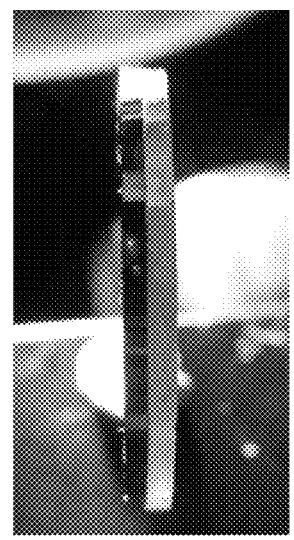
FIG. 6 shows an infrared transmitting Ge—As—S—Se based glass diffused GRIN optic with a sulfur concentration gradient from 0% to 61% over 62 μm.
Figure 7:
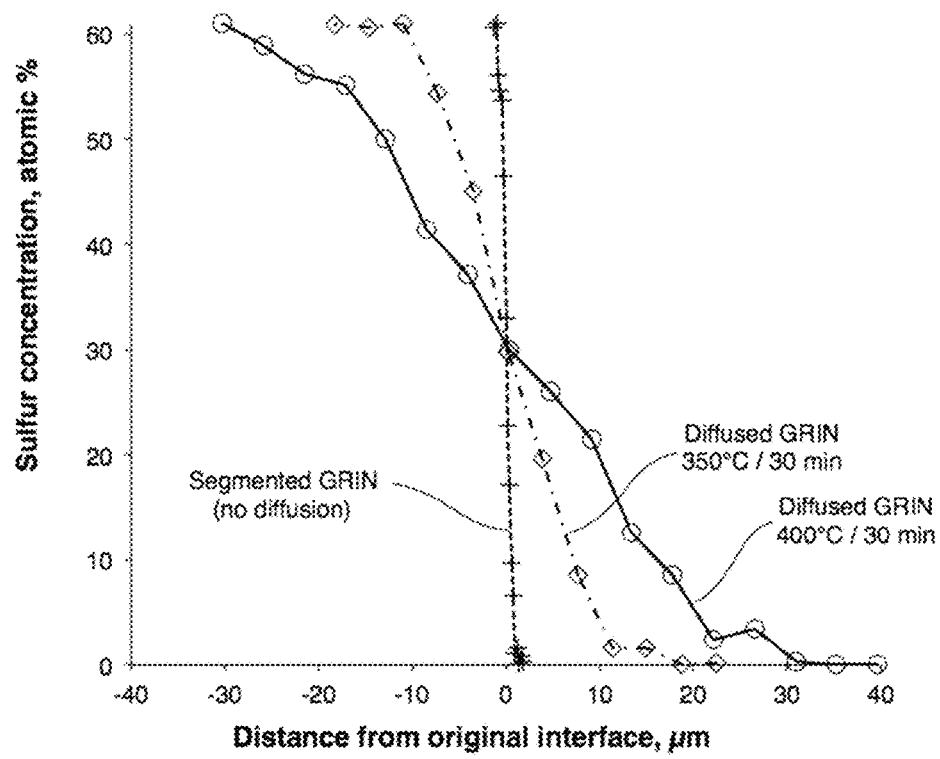
FIG. 7 shows sulfur concentration profiles in Ge—As—S—Se segmented GRIN (short dashed line), 350° C. diffused GRIN (dash-dot line), and 400° C. diffused GRIN (solid line) optical elements.

IR transmitting diffused axial GRIN optical elements comprising infrared transmitting glass comprising Ge, As, S and Se were fabricated using the method of the present invention and are shown in FIG. 6. The starting preforms were comprised of two glasses: $As_{39}S_{61}$ and $Ge_5As_{34}Se_{61}$ (subscripts denote concentration in atomic percentage) and each had a segmented axial GRIN profile. One preform was heated to a temperature of 350° C. for 30 minutes to create a first diffused axial GRIN optical element. A second preform was heated to a temperature of 400° C. for 30 minutes to create a second diffused axial GRIN optical element. Scanning electron microscopy with energy dispersive spectroscopy (SEM/EDS) was used to measure the concentration of sulfur near the interface within the segmented axial GRIN preform and near the center plane of the diffused axial GRIN optical elements. In the segmented axial GRIN preform, a sulfur concentration gradient from 61% to 0% was measured over a distance of about 1 μm (shown in FIG. 7), which coincides with the spatial resolution of the measurement technique. In the first and second diffused axial GRIN optical elements, processed at 350° C. and 400° C. respectively, sulfur concentration gradients from 61% to 0% were measured over distances of about 22 μm and 62 μm respectively (also shown in FIG. 7).

Example 3

Figure 8:
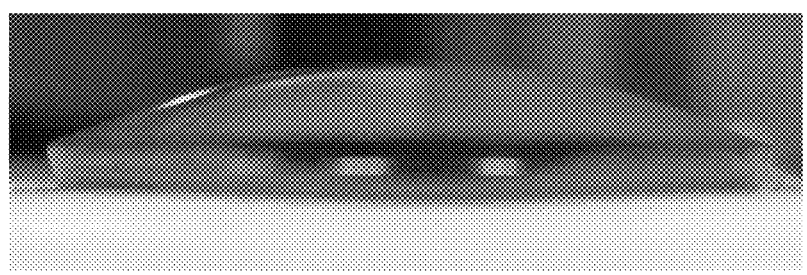
FIG. 8 shows a curved segmented GRIN optic with a gradient.

An IR transmitting diffused axial GRIN optical element comprising infrared transmitting glass comprising As and S was fabricated using an embodiment of the present invention and is shown in FIG. 8. The starting preform was comprised of two glasses with different As/S ratios with a single planar interface midway between the preform faces and has a segmented axial GRIN profile. The preform was heated to a temperature of 300° C. for 30 minutes in contact with a spherical mold to create a diffused GRIN optical element with curved surfaces and a spherical refractive index gradient.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method of making a gradient index infrared transmitting optic, comprising:
   thermally treating a preform at a temperature between 300 and 400° C. for 30 minutes, wherein the preform comprises only two infrared transmitting glasses, wherein each glass has a different composition and different optical properties, wherein there is an interface between the glasses, wherein during the thermal treatment one or more chemical elements from the glasses diffuses through the interface resulting in a diffused gradient index optical element comprising a gradient in the chemical element concentration, and wherein the optical element has a gradient in refractive index and dispersion.

2. The method of claim 1, wherein each glass comprises S, Se, Te, Ga, Ge, As, Sn, Sb, Ag, or any combination thereof.

3. The method of claim 1, wherein at least one glass comprises F, Cl, Br, I, or any combination thereof.

4. The method of claim 1, wherein the interface is substantially free of soot, bubbles, voids, pores, and foreign matter.

5. The method of claim 1, wherein the optical element enables lenses to function in the infrared wavelength range of 800 nm to 18 µm.

6. The method of claim 1, wherein the preform is shaped during the thermal treatment.

7. An infrared transmitting optical element having a refractive index profile and a dispersion profile made by the method, comprising:

thermally treating a preform at a temperature between 300 and 400° C. for 30 minutes, wherein the preform comprises only two infrared transmitting glasses, wherein each glass has a different composition and different optical properties, wherein there is an interface between the glasses, wherein during the thermal treatment one or more chemical elements from the glasses diffuses through the interface resulting in a diffused gradient index optical element comprising a gradient in the chemical element concentration, and wherein the optical element has a gradient in refractive index and dispersion.

8. The optical element of claim 7, wherein each glass comprises S, Se, Te, Ga, Ge, As, Sn, Sb, Ag, or any combination thereof.

9. The optical element of claim 7, wherein at least one glass comprises F, Cl, Br, I, or any combination thereof.

10. The optical element of claim 7, wherein the interface is substantially free of soot, bubbles, voids, pores, and foreign matter.

11. The optical element of claim 7, wherein the optical element enables lenses to function in the infrared wavelength range of 800 nm to 18 µm.

12. The optical element of claim 7, wherein the preform is shaped during the thermal treatment.

* * * * *